Feb. 1, 1955      P. BOONE      2,700,919
DECORATIVE MATERIALS AND DEVICES HAVING
POLARIZING AND BIREFRINGENT LAYERS
Filed April 26, 1951

INVENTOR
Philip Boone

United States Patent Office 2,700,919
Patented Feb. 1, 1955

2,700,919

DECORATIVE MATERIALS AND DEVICES HAVING POLARIZING AND BIREFRINGENT LAYERS

Philip Boone, Winchester, Mass.

Application April 26, 1951, Serial No. 223,107

2 Claims. (Cl. 88—65)

This invention relates to light-modifying materials and devices and to constructions thereof. More particularly the invention relates to decorative materials which provide varying interference color effects of unusual quality such as fabrics, panels, sheets or the like, and to devices incorporating said materials for providing interference color effects.

In general, the present invention may be considered as relating to an optical arrangement of light-polarizing, birefringent and reflecting elements wherein incident light is transmitted through the first- and second-named elements to the reflecting element and is then reversely transmitted through the second- and first-named elements. Such an arrangement is known to be capable of producing interference colors where the birefringent element alters the direction of and provides a suitable retardation of vibration components of light and the light polarizer acts both as a polarizer and analyzer. This arrangement may be compared in operation, for example, to a parallel transmission light-polarizing system having parallel polarizing directions of a pair of polarizers and an axial direction or optic axis of a birefringent element extending at a suitable angle relative to the polarizing directions. In one embodiment of the invention the incident light may be polarized.

As far as is known, where any arrangements of such elements embodying a reflecting surface for producing interference colors, and suitable for forming areas of considerable extent have heretofore been suggested, they have been deficient in several constructional and functional respects which, accordingly, have rendered them unsuitable for commercial use. More particularly, these deficiencies relate to the "flat" or "metallic" and, thus, somewhat unattractive quality of the interference colors produced and to an undesirable and peculiar directional limitation of interference color-producing rays emanating from the construction, beyond the field of which the colors can be seen only very dimly or not at all. Moreover, no constructions have been shown which appear related to the more specific forms described herein, such as flexible fabrics and either pliant or rigid panels having decorative and utilitarian uses when employed, for example, in the manufacture of bags, cases, compacts, piping, etc. Decorative or display objects of larger area, such as panels, drapes, coverings, clothing, theatrical properties, advertising displays or the like, may also advantageously be formed of materials and elements described herein. Special coacting lens-like or prismatic components, special reflecting components, special light-polarizing and birefringent elements and supporting materials are employed in constructions of the present invention to further alter the directions of, and to provide a varying retardation of the above-described vibration components of light.

It will be understood that the production of interference colors through the coaction of light-polarizing, birefringent and reflecting elements involves a unique modification of vibration components which differs optically from other color-producing phenomena such, for example, as that which relies upon the absorption of certain wavelengths. Accordingly, constructions and shapes of elements of the invention have a special significance relative to light-polarizing, birefringent and reflecting properties thereof or of associated elements which would neither exist in nor be suggested by other color-producing systems.

Through constructions described herein, aforementioned deficiencies of "flatness" of color, lack of intensity and loss of color at acute angles have largely been overcome. Accordingly, the invention provides predetermined interference colors of improved depth and crystal-like quality, reduces surface reflection where maximum "entrance" of light is of importance, provides lens-like and other light-gathering elements for improving the intensity of interference colors and provides improved visibility of interference colors relative to acute viewing angles. Moreover, the constructions are adapted to the aforementioned decorative and utilitarian uses. Accordingly, it is an object of the invention to provide useful and decorative light-modifying devices and materials which exhibit predetermined interference color effects of improved beauty, visibility and variety.

Another object of the invention is to provide materials of the character described which produce a predominant interference color throughout large areas.

A further object of the invention is to provide such materials or products which have an enhanced "light-gathering" quality.

Still another object of the invention is to provide interference color-producing materials showing a depth or crystal-like quality of color.

A still further object of the invention is to provide an assembly including means for increasing the intensity of visible interference colors.

Another object of the invention is to provide fabrics or panels of the character described exhibiting interference colors which are of improved visibility and brilliance when viewed from acute angles relative to the major surfaces thereof.

A further object of the invention is to provide composite materials of the character described having embossed or otherwise shaped supporting portions, light-transmitting portions and light-reflecting portions or elements for achieving the improvements described herein.

Still another object of the invention is to provide materials having optical qualities of the types described in the form of fabrics, panels or the like, which are suitable for various decorative and utilitarian purposes.

A still further object of the invention is to provide a device for providing interference color effects and for varying the quality of said effects.

These and other objects of the invention will be apparent from the following description taken in connection with the accompanying drawings wherein like reference characters refer to like parts throughout the several views.

The examples shown in the drawings are enlarged for clarity and are not necessarily to be regarded as defining focal lengths of certain elements nor other exact physical or optical specifications.

Figure 1:
Figure 1 is a cross-sectional view of one form of the invention having a contoured or embossed form of surface layer.

In the several drawings, shown in cross-section, an upper surface may be regarded as a front surface and a lower surface as a rear surface. Where bonding substances are not shown in the drawings their presence is indicated in the description.

Referring to Fig. 1, an assembly representing a fragment of a fabric or panel is shown in cross-section. A supporting or carrier layer 12 may be formed of any suitable material such as a cloth, paper, plastic sheet, glass, metal or the like. A reflecting surface 14 is formed on the supporting layer and may, for example, consist of a metallic foil, such as aluminum, bonded to the supporting material by gutta percha, polyvinyl butyral or any other suitable bonding material. Alternatively, reflecting surface or layer 14 may be formed by chemical deposition, by metal spraying, by applying metallic powders, or through some other method. If supporting layer 12 is composed of metal, it will obviously provide a reflecting surface of itself. A birefringent or retardation layer 16, formed, for example, of a film of suitably oriented polyvinyl alcohol, cellulose acetate, ethyl cellulose or the like, is bonded to reflecting surface 14. As required, a subcoat or intermediate coating may be applied to reflecting surface 14 to facilitate bonding of layer 16 thereto. Any suitable bonding material may be employed, for example a polyvinyl alcohol dope if layer 16 is formed of polyvinyl alcohol, a thermoplastic material such as polyvinyl butyral or any other properly chosen bonding substance such as vinyl acetate, methyl methacrylate, etc. A light-polarizing layer 18 is bonded to layer 16, layer 18 being, for example, a film-like light-polarizing material of commercial grade, such as treated polyvinyl alcohol, which may be bonded to layer 16 by water or a polyvinyl alcohol dope. A transparent surface layer 20 is formed upon or bonded to layer 18 and may suitably be composed of pyroxylin, Vinylite, glass, or any other material adapted to embossing or other alteration of surface texture. Accordingly, it will be seen that layer 20 may be either flexible or rigid. If required, for good adhesion of layers 20 and 18, a suitable subcoat may first be applied to layer 18. The polarizing direction of layer 18 and a principal or optic axis of layer 16 are so disposed as to form an angle relative to one another as, for example, an angle of 45°. Or, birefringent layer 16 may have portions differently oriented through methods known to the art or be of a composite structure so that several different angles are formed with the polarizing direction of layer 18, as further described below. The thickness of birefringent layer 16 may be constant or may vary in different portions. The direction or directions of orientation of birefringent layer 16 and its thickness may be controlled by predeterminedly stretching or otherwise treating the material of which it is formed before bonding in the assembly. The composite product of Fig. 1 may be assembled in any convenient manner. For example, supporting layer 12 may have reflecting surface 14 formed thereon. Birefringent layer 16 may then be bonded to surface 14 or to a subcoat thereon and polarizing layer 18 then bonded to layer 16. Surface layer 20 may then be formed upon or bonded to layer 20, or to a subcoat thereon. Alternatively, layers 18 and 16 could be bonded together before bonding layer 16 to surface 14. If layer 20 is bonded to layer 18 it will be apparent that layer 20 may have a surface contour formed thereon prior to bonding. Bonding of the various layers may be performed by subjecting them, in assembled relation, to heat and pressure, as by passing them between pressure rollers and through ovens. Alternatively, they may be passed between heated rollers, subjected to infrared heating and autoclaving, depending upon the bonding materials used.

Further referring to Fig. 1, it is well known that the type of birefringent material employed, its thickness and the direction of an optic axis or optic axes thereof relative to the polarizing direction of an associated light-polarizing layer, are control factors in the production of predetermined interference colors of a predetermined order or orders. In addition, other control factors, to be described, are present in constructions of the present invention. Transparent layer 20 is shown as being composed of or having formed thereon a plurality of substantially curved or lens-like portions, such as portions a, d, g or h of Fig. 13. These portions may be said to serve as small converging or cylindrical lenses which appropriately have focal lengths permitting a focus upon reflecting surface 14 or approximating said focus. Their lens-like properties alter the directions of rays incident surface 22 and produce varying retardation effects by varying path lengths or optical paths which light rays or vibration components are caused to traverse through different portions of the birefringent layer. This provides a variable retardation within each contoured portion or element, a plurality of which are employed in forming large areas of the composite material. A dominant interference color or hue may, however, be rendered visible throughout said large areas, the color having a depth or crystal-like quality which is provided by the substantially curved portions. Moreover, these portions constitute light-gathering elements for transmitting a maximum amount of light to the reflecting surface which is of importance where a polarizing layer is present in the assembly which may absorb a considerable percentage of incident light. Again, the substantially curved portions or elements, through their refracting properties, serve to enhance the visibility of interference colors when the assembly is viewed from acute angles and to diminish the loss of light which would occur if incident on a plane surface through surface reflection. The substantially curved or prismatic forms of elements of the present invention contribute to a dominant interference color or hue pervading large areas of composite materials described herein. This is achieved because formations of said elements are capable of similarly refracting and/or reflecting components of light with respect to the viewer at any given position. Layer 20 further acts as a protective layer for the assembly. Thus, it will be seen that substantially curved or prismatic portions or elements of layer 20, coacting with layers 18 and 16 and surface 14, provide a further control factor for improving the function of the assembly in various important respects relating to hue, quality and visibility of the interference colors produced.

Again referring to Fig. 1, various forms of a reflecting surface 14 may be employed. A diffusing type of surface, such, for example, as the dull side of an aluminum foil, is particularly pleasing. A commercial grade of aluminum sheet having minute lines extending across its surface in a given direction will produce bands of light in surface elements as a and d of Fig. 13 extending at 90° to the surface lines. A spectrally reflecting surface 14 will produce asterism in surface elements such as a of Fig. 12. While a "neutral" type of reflector, such as aluminum, is preferred, a "gold" reflector or some other preferentially light-absorbing or reflecting type may be employed. Other forms of reflecting surfaces are shown hereinafter. Layer 20, or any other layer, may contain a small quantity of a tint, dye or the like to produce a color through light absorption which coacts to modify the interference colors, above described, or to provide a more pronounced color when the assembly is viewed from acute angles. Any suitable "dulling" substance may be added to the material forming surface layer 20 to further reduce surface reflection. Light-diffusing particles may also be distributed therein for further improving acute angular viewing of the color effects.

Figure 2:
Fig. 2 is a similar view of another example of the invention showing a modification of an embossed surface layer.
Figure 13:
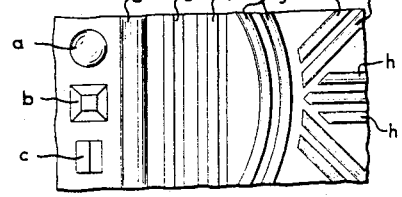
Fig. 13 is a plan view showing various examples of surface contour or embossing.

Fig. 2 represents an assembly which is generally similar to that of Fig. 1 and wherein a surface layer 24 has prismatic portions or elements such as b, c, e and f of Fig. 13. These portions also provide varying retardation effects through differentially refracting incident light rays and coact with light-polarizing layer 26, birefringent layer 28, and reflecting surface 30, carried by supporting layer 32 in a generally similar manner to that described relative to Fig. 1.

Figure 3:
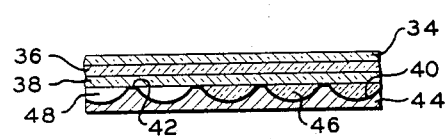
Fig. 3 is a similar view of a modification having a plurality of concave reflecting portions.

In Fig. 3 an assembly is shown which comprises a protective surface layer 34, a light-polarizing layer 36, a birefringent layer 38, a reflecting surface having a plurality of recessed or concave reflecting portions or elements 40 and a plurality of protuberant reflecting portions 42 formed upon a supporting element 44. A bonding substance 46, such as one of those above-named, is shown as substantially filling the concavity between layer 38 and surface 40 but, if preferred, only protuberances 42 need be bonded to layer 38, leaving a space substantially devoid of bonding substance as shown at 48. Reflecting surface portions 40 and 42 coact with layers 36 and 38 for reflecting and altering the relative retardation of light rays transmitted by said layers. The reflecting portions also contribute to a wider angle of visible interference color light rays emanating from the assembly. It will be apparent that surface layer 20 of Fig. 1 may be employed in Fig. 3 in place of layer 34 to provide a plurality of positive lens-like elements coacting with a plurality of concave reflecting elements. Surface layer 24 of Fig. 2 may also be employed therewith.

Figure 4:
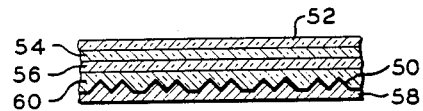
Fig. 4 is a similar view of a modification representing differently formed reflecting portions.

Fig. 4 shows an assembly which is generally similar to that of Fig. 3 excepting that a reflecting surface 50 is formed of a plurality of prismatic portions. These portions differentially reflect light rays incident protective surface layer 52, light-polarizing layer 54 and birefringent layer 56, and provide an alteration of relative retardation of vibration components as well as broadening the angle of visibility of the interference colors. Reflecting surface 50 is carried by supporting layer 58. Bonding substance 60 may or may not entirely fill the area between surface 50 and layer 56, as described relative to Fig. 3. The various embossed forms shown in Fig. 13, which are merely examples, or any other appropriate contour extending in any desired direction may be employed with respect to the reflecting surfaces shown in the drawings. Concave portions of the reflecting surfaces may also be formed in as many shapes and directions. It will be understood that the reflecting means of Fig. 4 may be employed in an assembly embodying the surface contours of Figs. 1 or 2 or some other contour.

Figure 5:
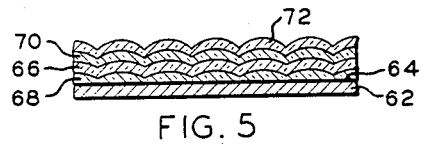
Fig. 5 is a similar view of a modification showing a plurality of embossed or nonplanar layers and a plane reflecting surface.

Fig. 5 illustrates a composite structure comprising a supporting or backing element 62 having a reflecting surface 64, a birefringent layer 66 bonded to surface 64 by a bonding material 68, a polarizing layer 70 bonded to layer 66 and a front surface layer 72 formed upon or bonded to layer 70. Layers 66, 70 and 72 may, for example, be embossed simultaneously after the assembly is formed. This construction provides portions of the birefringent and polarizing layers which are also substantially curved and presents additional means for varying the retardation of vibration components with respect to the viewer, inasmuch as the birefringent layer, per se, is curved and may be of varying thickness. Optical considerations hereinbefore described relate to the substantially curved surface portions of layer 72.

Figure 6:
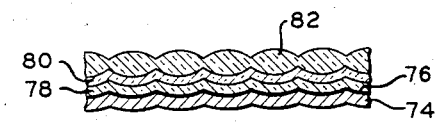
Fig. 6 is a similar view of a modification showing a lens-like surface layer, nonplanar adjacent layers and a nonplanar reflecting surface and supporting layer.

In Fig. 6, the composite material consists of a supporting layer 74 having a reflecting portion or element 76. A birefringent layer 78 and a light-polarizing layer 80 are bonded thereto and a transparent layer 82 is formed upon or bonded to layer 80. Bonded layers 74, 78 and 80 may, for example, be embossed simultaneously, layer 82 formed on layer 80 and then layer 82 may be embossed to provide the relation of a plurality of converging lens-like portions coacting with a plurality of concave reflecting portions. Other optical considerations previously described apply to the assembly of Fig. 6. It is to be understood that embossed and recessed contours, when included in both outer and reflecting surfaces of a given assembly, need not always be exactly superposed relative to one another. It follows that said contours need not invariably be of similar form nor extend in similar directions. However, superposition of functionally coacting contoured portions may often be desirable and indeed necessary for best optical results, as evidenced by the drawings.

Figure 7:
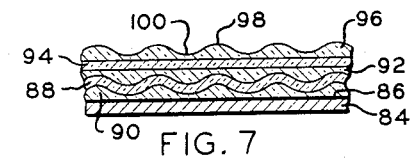
Fig. 7 is a similar view of a modification representing non-planar inner layers and plane reflecting and surface layers.

Fig. 7 represents a composite material consisting of a supporting layer 84 having a reflecting component 86, an embossed birefringent layer 88 bonded to component 86 by bonding substance 90, a bonding substance or subcoat 92 formed upon layer 88, a light-polarizing layer 96 formed upon or bonded to layer 94. Layer 96 comprises converging lens-like portions 98 and diverging lens-like portions 100. Each of the portions 98 and 100 contributes to varying retardation of vibration components. Other optical properties have been described above.

Figure 8:
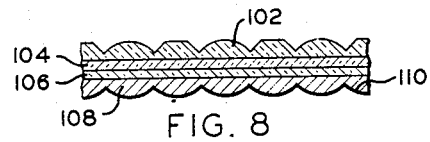
Fig. 8 is a similar view of a modification in which an underlying supporting or backing layer has been omitted.

Fig. 8 shows a surface layer 102, a light-polarizing layer 104 bonded thereto, a birefringent layer 106 bonded to layer 104, a transparent layer 108 formed upon layer 106, and a reflecting coating 110 formed upon layer 108. It will be noted that this assembly omits the supporting layer underlying the reflecting surface, heretofore shown. Surface contours of layer 102 are substantially curved or prismatic. Alternatively, layer 108 may be omitted and transparent coating 110 applied directly to layer 106. A reflection coating may be applied directly to the birefringent layer, or to a subcoat formed thereon in other examples shown in the drawings.

Figure 9:
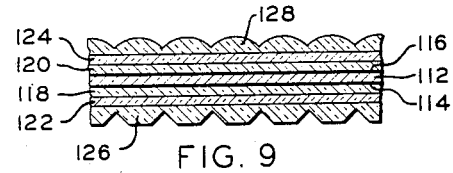
Fig. 9 is a cross-sectional view of a modification capable of showing interference colors from both front and rear (top and bottom) surfaces.

Fig. 9 represents an assembly which exhibits interference colors when viewed either from front or rear surfaces. A central supporting layer 112, having reflecting portions 114 and 116, has birefringent layers 118 and 120 bonded thereto. Light-polarizing layers 122 and 124 are bonded to the birefringent layers. Transparent surface layers 126 and 128, suitably contoured, are formed upon or bonded to the polarizing layers. The operation of the coacting layers, to either side of the central layer, will be obvious from the description of Figs. 1 and 2. Any of the modified reflecting means, hereinbefore described, may be incorporated with the assembly of Fig. 9.

Figure 10:
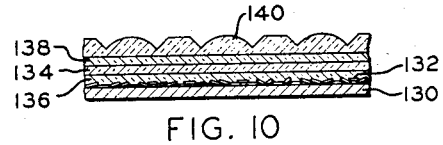
Fig. 10 is a similar view showing a modified reflecting portion or element.

Fig. 10 illustrates an assembly comprising a supporting layer 130, a plurality of reflecting particles 132 bonded to layer 130, a birefringent layer 134 bonded to reflecting particles 132 by a bonding substance 136, a light-polarizing layer 138 bonded to layer 134, and a contoured surface layer 140 formed upon or bonded to layer 138. Particles 132 provide various angular surfaces which contribute to a varying retardation of components of light reflected thereby by providing varying path lengths relative to layer 134, as well as providing a certain diffusion of the reflected rays. The function of layers 134, 138 and 140 has been described above.

Figure 11:
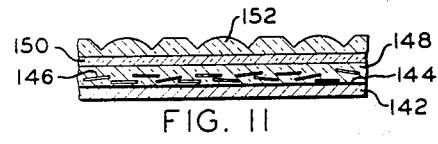
Fig. 11 is a similar view showing a modified birefringent layer or element.

In Fig. 11 a composite material is shown consisting of a supporting element 142 having a reflecting surface portion 144. A plurality of birefringent elements, particles or flakes 146, optionally having overlapping portions and having differently extending optic axes, are bonded to surface 144 by a bonding substance 148. A light-polarizing layer 150 is bonded to particles 146 and a contoured transparent surface layer 152 is formed upon or bonded to layer 148. Overlapping portions, and/or portions having differently extending optic axes of particles 146, provide properties of varying birefringence in the particles which contribute to varying retardation of components of light. Angular disposition of the particles relative to the planes of surface 144 and layer 150 also affects the retardation of said components. This arrangement will permit variation of interference color effects when a polarizing light source, including means for varying a polarizing direction of transmitted light, is included. Other considerations relating to the assembly have been described above.

Figure 12:
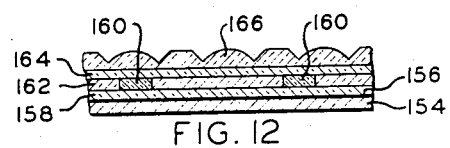
Fig. 12 is a similar view showing a composite birefringent layer or layers.
Figure 14:
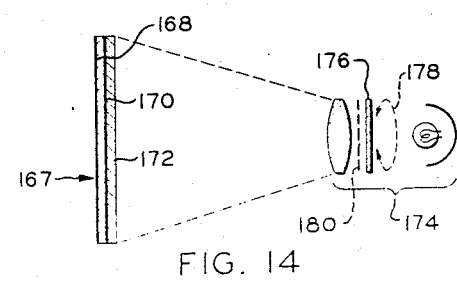
Fig. 14 is a diagrammatic illustration of another embodiment of the invention.

Fig. 12 illustrates a composite assembly including a supporting layer 154, a reflecting element 156, a birefringent layer 158 bonded to element 156 having a predetermined principal of optic axis throughout the area thereof, birefringent elements 160, such as strips or designs bonded to layer 158, having a principal or optic axis or axes extending in a preferably similar though permissibly different direction of directions from said axis of layer 158, a bonding substance 163, a light-polarizing layer 164 bonded to elements 160 and layer 158, having a predetermined polarizing direction throughout its area, and a contoured surface layer 166 formed upon or bonded to layer 164. Elements 160, by providing at least a different thickness of birefringent material where they are superposed upon layer 158, alter the birefringence of optically aligned portions and thus alter the retardation of vibration components passing through said portions relative to adjacent portions. Accordingly, the interference colors visible in said portions differ from those visible in other portions of the assembly and the construction may be employed for providing an assembly wherein lettering, designs or the like appear in one or more colors in contrast to other color effects in the surrounding portions. Various modifications of this construction will be apparent. For example, elements 160, having a different direction or directions of an optic axis or axes from the optic axis of layer 158 may be inset in similarly shaped, cut-out portions of the last-named layer. This construction permits variable relative interference color effects between elements 160 and surrounding portions of layer 158 or a contrast of value of interference colors therebetween when the assembly is subjected to a coacting light source having rotatable light-polarizing means for altering the polarizing direction of light directed upon the assembly, as shown in Fig. 14. A further modification contemplates omission of layer 158 in which event interference colors would be visible in birefringent elements 160 only. Alternatively, light-polarizing layer 164 could be in the form of strips, designs or the like having a polarizing direction or directions similar to or departing from the direction or directions of an optic axis or axes of a superposed birefringent layer or elements, but this modification is less preferred from a constructional viewpoint.

Fig. 13 exemplifies various contours which may be applied by embossing or other treatment to a surface layer, a reflecting layer and to light-polarizing and birefringent layers of the constructions hereinbefore described. It is to be understood that the contours shown are merely representative of a vast number of forms or configurations which could be employed and that said contours could be recesses rather than protuberances, particularly as applied to a reflecting surface or element.

Fig. 14 shows an assembly 167 comprising a reflecting element 168, a birefringent layer 170, and a light-polarizing layer 172, in bonded relation, and a coacting polarized light source or element 174 having a rotatable light-polarizing element 176 positioned in the path of light, the whole constituting a device for producing variable interference colors and for varying the values of said colors. The rotatable mounting of element 176 is indicated by double-headed arrow 178, although it would be apparent that the entire element 174 could be rotated, if preferred. Rotation of elements 174 or 176 alters the polarizing direction of light emanating therefrom which coacts with polarizing, birefringent and reflecting layers 172, 170 and 168, respectively, and such contoured portions of said layers or of other layers, described herein, as may be included to provide varying interference colors or values thereof. The relation of a light-polarizing direction or directions and an optic axis or axes of light-polarizing and birefringent elements or layers, respectively, hereinbefore described, is understood to exist in assembly 167. Any of the supporting layers, surface layers or contours of various layers above-described may be incorporated with device portion 167 to obtain the special advantages accruing thereto. Moreover, the special birefringent and light-polarizing layers or elements described relative to Figs. 11 and 12 may be incorporated with portion 167 to the utmost advantage, said layers or elements coacting with variable polarized light-producing element 174 to provide variations of interference color values thereof when device portion 167 is viewed from a position facing layer 172. Alternatively, lettering or designs cut from one of the composite materials shown herein could be overlaid on a large area of one of said materials, the axial and polarizing directions varying therebetween to provide different effects between said lettering or designs and adjacent portions. The device of Fig. 14 is well suited to theatrical usage where, for example, stage properties or background and/or clothing of acting personnel are formed according to assembly 167 or other constructions described herein, and element 174 (or a plurality of variable polarized light sources) is positioned in a concealed position in front portions of the stage or in a projection booth. Because of the light-absorbing properties of light-polarizing film material of present commercial grade, a light source or sources of high intensity are advised. It will be understood that lens and reflector means associated with element 174 and the spacing of element 174 with respect to bonded layer portion 167 are predetermined for directing a maximum amount of light toward said portion 167. In addition to the above-described theatrical effects, the suitability of the device of Fig. 14 for window displays and spectacular billboard effects at night, for night-club decorating or the like may also be evident.

A movable birefringent sheet-like element or elements may be interposed in the path of light between element 176 and composite element 167 as, for example, at dashed line 180. The movable birefringent element, having predetermined birefringent or retardation properties, may, appropriately, be in the form of a rotatable disk whereby the optic axis thereof may be varied relative to the polarizing direction of polarizer 176 and polarizing and axial directions of composite element 167. By rotating said disk, variations of color value and hue may be obtained in the interference color light rays emanating from said composite element 167. Moreover, where element 167 embodies inset or superposed birefringent or polarizing portions such as those suggested relative to Fig. 12, or such portions wherein optic axes or polarizing directions vary from those of other portions, contrasts of interference color value and hue may be obtained between the different portions. Either system, namely, that embodying only the rotatable polarizer 176 with composite element 167 or that embodying polarizer 176, the movable birefringent disk and the composite element 167, may be employed for achieving variations of interference color value or hue, depending upon the construction of composite element 167, as described. It will be apparent that where strip or design portions of composite element 167 have axial directions or birefringent values different from other portions, selected portions may be utilized for producing lettering or designs of varying color value or hue, such that said lettering or designs may be visible or invisible or appear in different colors, as the aforesaid movable polarizing and/or birefringent elements are altered in position. It will also be apparent that these systems may be employed for achieving "animation" of portions of composite element 167 provided adjacent portions are arranged to produce hue or value effects in sequence. Where said movable birefringent disk is employed, it is not necessary that polarizer 176 be rotatable although its rotation permits more flexibility in the effects obtainable. It will further be evident that the rotatable birefringent disk at 180 or rotatable polarizer 176 may be actuated by a suitable actuating means, such as a motor (not shown). Alternatively, the birefringent disk at 180 may be mounted so that it can be tilted in the path of light, thus altering its effective thickness and birefringence. A further modification contemplates a birefringent sheet or sheets of varying thickness which may be moved substantially transversely of the path of light.

In all of the constructions described, it is to be stressed that the composite bonded assemblies or portions are capable of exhibiting maximum interference color effects, either in polarized or unpolarized light, or in a mixture of the two forms of light, and that the value and/or hue may be varied where a polarized light source is employed. Accordingly, it will be evident, in the various uses suggested, that said assemblies or composite materials are adapted to provide at least predetermined portions in full color when subjected to incandescent or fluorescent light sources or to daylight and that special effects are obtainable when they are subjected to polarized light. When subjected to polarized light, areas adjacent composite bonded constructions of the invention, which are formed of some other material, will appear unchanged during movement of variable polarizing or birefringent elements and such areas may be used in conjunction with said bonded construction for special effects. Thus, the constructions are capable of functioning both in normal theatrical lighting and in a polarized lighting system, though differently, as described. It follows that window displays, advertising signs or the like, embodying the constructions described herein, are capable of exhibiting brilliant effects in daylight, normal artificial light and polarized light, with special effects, above enumerated, possible in the latter.

The birefringent layer of any of the constructions of Figs. 1 through 12 may be omitted when used with polarizing element 176 of Fig. 14 and the movable birefringent element at 180 thereof to provide other effects within the scope of the invention, but no color would be visible in unpolarized light.

It will be apparent that various other modifications of the composite materials and devices described herein may be made according to the principles set forth. Accordingly, such examples as have been presented are to be regarded as merely illustrative and the invention may be otherwise embodied and practiced within the scope of the following claims.

What is claimed is:

1. A decorative sheet material which exhibits interference color effects having individual given properties of color, depth, and visibility throughout a wide viewing angle comprising, in relative order of arrangement with respect to the inward passage of light rays incident upon said material, a layer embodying a plurality of lenticular elements for differentially refracting light rays passing therethrough, a light polarizing layer, a birefringent layer, and a light reflecting layer, said light polarizing layer having a given polarizing direction and said birefringent layer having a given thickness and a principal direction suitably oriented with respect to said polarizing direction to provide a given interference color of those light rays which have passed in order through said light polarizing and birefringent layers to said reflecting layer and return, said first-named lenticular layer variously altering the direction of the rays to thereby vary the retardation effect of the birefringent layer.

2. A sheet material according to claim 1 in which the layers are in bonded relation and are of a flexibility such that the sheet material is flexible.

References Cited in the file of this patent

UNITED STATES PATENTS

| | | |
|---|---|---|
| 1,882,829 | Hall | Oct. 18, 1932 |
| 2,017,705 | Sproxton | Oct. 15, 1935 |
| 2,018,214 | Land | Oct. 22, 1935 |
| 2,158,129 | Land | May 16, 1939 |
| 2,169,022 | Chubb | Aug. 8, 1939 |
| 2,180,114 | Land | Nov. 14, 1939 |
| 2,362,573 | MacNeille | Nov. 14, 1944 |

FOREIGN PATENTS

| | | |
|---|---|---|
| 457,443 | Great Britain | Nov. 30, 1936 |
| 683,933 | Germany | Nov. 18, 1939 |